United States Patent

Moore et al.

[11] Patent Number: 5,939,632
[45] Date of Patent: Aug. 17, 1999

[54] MICROMECHANICAL ACCELEROMETER

[75] Inventors: David Frank Moore; Stuart Clyde Burgess; Heather Klaubert; Hiang-Swee Chiang, all of Cambridge, United Kingdom; Narito Shibaike, Tama-ku; Takashi Kiriyami, Tokyo, both of Japan

[73] Assignees: Cambridge University Technical Services Limited, Cambridge, United Kingdom; Matsushita Electric Industrial Co. Ltd., Kadoma; The University of Tokyo, Tokyo, both of Japan

[21] Appl. No.: 08/875,384

[22] PCT Filed: Dec. 22, 1995

[86] PCT No.: PCT/GB95/03018

§ 371 Date: Oct. 3, 1997

§ 102(e) Date: Oct. 3, 1997

[87] PCT Pub. No.: WO96/21157

PCT Pub. Date: Jul. 11, 1996

[30] Foreign Application Priority Data

Dec. 29, 1994 [GB] United Kingdom .................. 9426363

[51] Int. Cl.⁶ .................................................. G01P 15/08
[52] U.S. Cl. .................................... 73/514.16; 73/514.32; 73/866.5
[58] Field of Search .......................... 73/514.01, 514.16, 73/514.17, 514.18, 514.21, 514.23, 514.34, 514.35, 514.36, 105, 866.5; 250/306, 307

[56] References Cited

U.S. PATENT DOCUMENTS 4,999,735  3/1991  Wilner ..................................... 361/283
5,431,051  7/1995  Biebl et al. ............................ 73/514.36
5,490,422  2/1996  Tabota et al. ......................... 73/514.34

FOREIGN PATENT DOCUMENTS 0 054 707 A1   6/1982   European Pat. Off. .
0 605 300 A1   7/1994   European Pat. Off. .
41 00 451 A1   7/1991   Germany .
WO 95/19571    7/1995   WIPO .

OTHER PUBLICATIONS

K. Minami et al., "YAG Laser Assisted Etching for Releasing Silicon Micro Structure", IEEE Cat. No. 93CH2365–6, Ft. Lauderdale, Florida, Jul. 2, 1993, pp. 53–58.

Kaiser et al., "Tunnel Effect Displacement Sensor", NTIS Tech Notes, Springfield, Virginia, Apr. 1990.

Rockstad et al., "A Miniature High—Sensitivity BroadBand Accelerometer Based on Electron Tunneling Transducer", Sensors and Actuators—A Physical, Lausanne, vol. A43, No. 1/3, May 1994, pp. 107–114.

*Primary Examiner*—Herzon Williams
*Assistant Examiner*—Richard A. Moller
*Attorney, Agent, or Firm*—Ratner & Prestia

[57] ABSTRACT

There is disclosed an accelerometer comprising a substrate, a proof mass mounted to the substrate for movement in a first direction perpendicular to the plane of the substrate, the proof mass carrying a first sensing electrode, a second sensing electrode mounted relative to the substrate, wherein the first and second sensing electrodes comprise surfaces extending at an angle relative to the substrate and defining between them a sensing gap the width of which varies with movement of the proof mass in the first direction.

13 Claims, 4 Drawing Sheets

MICROMECHANICAL ACCELEROMETER

This application is the U.S. national-phase application of PCT International Application No. PCT/GB95/03018.

TECHNICAL FIELD OF THE INVENTION

This invention relates to a micromechanical accelerometer, that is an accelerometer constructed, preferably from silicon, using micromechanical techniques.

BACKGROUND OF THE INVENTION

Silicon microfabricated accelerometers are being intensively developed because of the possibility of low cost batch fabrication. Such accelerometers include a seismic or proof mass which is anchored to a silicon substrate by a micromechanical suspension system. In one commercially available chip (ADXL50), the position of the proof mass is detected by a differential capacitance measurement. Using a force-balance configuration, the proof mass deflects in response to acceleration to which the chip is subjected, a sense signal arising from the differential capacitance measurement is amplified and fed back to electrostatically deflect the proof mass and counteract the effect of the acceleration. The output from the accelerometer is the required feedback voltage to counteract the effect of the acceleration.

Tunnel based accelerometers have also been proposed, in which the sense signal is derived from a tunnel current between a sensing tip and a counter electrode. Such a tunnel based sensor has been proposed in a paper entitled "A miniature high sensitivity broad-band accelerometer based on electron tunnelling transducers", authored by Howard K. Rockstad et al and published at the 7th International Conference on Solid State Sensors and Actuators, pages 836 to 839. Such tunnel based accelerometers have a greater sensitivity than capacitive accelerometers, but they require more than one silicon wafer for their manufacture. In the arrangement described in the preceding article by Rockstad et al, three wafers are required to make the accelerometer. Each wafer includes components of the accelerometer which must be carefully aligned when the wafers are secured together. Manufacturing costs of such accelerometers are high because of the need to produce components within three wafers and then to carefully align the wafers during construction of the accelerometer.

It is an object of the present invention to provide an accelerometer which combines high sensitivity and low cost manufacture.

SUMMARY OF THE INVENTION

According to one aspect of the present invention there is provided an accelerometer comprising: a substrate; a proof mass mounted relative to the substrate for movement in a first direction perpendicular to the plane of the substrate, the proof mass carrying a first sensing electrode; and a second sensing electrode mounted relative to the substrate, wherein the first and second sensing electrodes comprise surfaces which are respectively formed by cutting so as to extend at an angle relative to the substrate and define between them a sensing gap which is held to a predetermined width by use of an activation applied between the substrate and the structure constituting the proof mass and the second electrode, and the width of which varies with movement of the proof mass in the first direction.

It will be apparent that the second sensing electrode will generally be mounted relative to the substrate in a manner which is relatively stiff compared to the mounting of the proof mass to the substrate.

In the described embodiment, the proof mass is mounted in a cantilevered fashion, that is with one end of a cantilever fixed to the substrate and the other end of the cantilever free to move in the first direction. In one embodiment, the cantilever itself can constitute the proof mass. In another embodiment, the cantilever carries a region of larger cross-section which constitutes the proof mass. In a still further embodiment, a region of larger cross-section constituting the proof mass is mounted relative to the substrate using two cantilevers on either side of the proof mass. This arrangement is stiffer in a plane parallel to the plane of the substrate.

The accelerometer can comprise circuitry for sensing variations in the width of the sensing gap. In one arrangement, the sensing circuitry detects changes in a tunnelling current between the first and second sensing electrodes. In this arrangement, a voltage is applied between the proof mass and the substrate. Arrangements in which the proof mass is provided by an area of larger cross-section are advantageous in this respect because they allow more easy application of a voltage sufficient to generate the required electric field to cause the sensing gap to adopt a width where a tunnelling current will result.

In a particularly preferred embodiment, the second sensing electrode is mounted to the substrate at a location internally of a surrounding proof mass. The proof mass can comprise a perforated diaphragm suspended for movement in the first direction relative to the substrate.

An accelerometer in accordance with the present invention can be much more easily and cheaply manufactured than accelerometers according to the prior art because the proof mass, the first sensing electrode and the second sensing electrode can be formed as components in a single wafer. The proof mass, the first sensing electrode and the second sensing electrode can be formed in single crystal silicon.

The invention also provides a method of making an accelerometer comprising the steps of: forming a component supported at opposed end regions thereof with respect to a substrate and spaced from the substrate at central region thereof; and cutting a gap in the component at an angle incident to the plane of the substrate to form two angled surfaces which respectively extend at an angle relative to the substrate and which constitute first and second sensing electrodes defining between them a sensing gap, wherein the sensing gap is held to a predetermined width by use of an activation applied between the substrate and the structure constituting the component, and varies with movement of at least a part of the structure.

By using these steps, the accelerometer can be formed in a single composite wafer comprising a silicon substrate, a layer of silicon dioxide and a top layer of silicon. While this provides particular advantages, it will readily be appreciated that the accelerometer could be formed in a conventional wafer on top of which has been deposited a layer of silicon dioxide and a layer of silicon.

The cutting step can be carried out using a focused high energy ion beam or a laser.

These techniques provide an angled cut in a simple and cost effective manner.

For a better understanding of the present invention and to show how the same may be carried into effect, reference will now be made by way of example to the accompanying drawings.

DESCRIPTION OF THE PREFERRED EMBODIMENTS

Figure 1A:
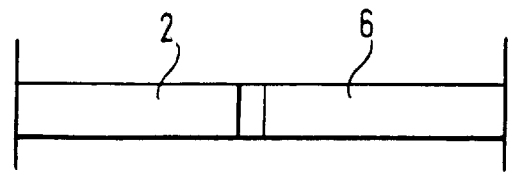
FIGS. 1a and 1b are a plan view and a side view of sensing electrodes in an accelerometer.
Figure 1B:
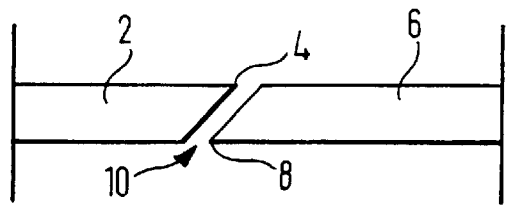

FIGS. 1a and 1b illustrate the concept underlying the accelerometers of the present invention. In FIGS. 1a and 1b, reference numeral 2 denotes a component connected to a proof mass and which has a first sensing electrode in the form of a sensing tip 4. Reference numeral 6 denotes a component which is mounted to the substrate and which has a second sensing electrode in the form of a counter electrode 8. In FIG. 1a, the components 2 and 6 are formed in a plane parallel to the plane of a substrate. Thus it can be seen from FIG. 1b that the sensing tip 4 and counter electrode 8 each comprise a surface extending at an angle relative to the substrate. The surfaces of the sensing tip 4 and counter electrode 8 define between them a sensing gap 10, the width of which varies when the component 2 moves with respect to the component 6. The angle of the surfaces of the sensing tip 4 and counter electrode 8 can lie for example between 30° and 60° with respect to the plane of the substrate and in a particularly advantageous embodiment, the angle may lie between 53° and 55° to align with the crystal (111) direction.

Figure 2A:
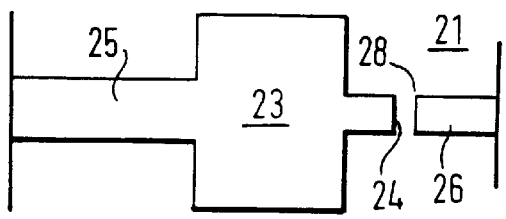
FIGS. 2a and 2b are a plan view and a side view of a proof mass with sensing electrodes in an accelerometer.
Figure 2B:
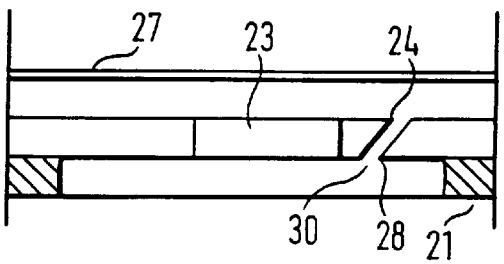

FIGS. 2a and 2b illustrate in plan view and side view respectively one embodiment of an accelerometer using a sensing tip and counter electrode with angled surfaces as described above with reference to FIGS. 1a and 1b. In FIG. 2a, reference numeral 21 denotes a substrate to which is mounted on a cantilever 25 a proof mass 23. The proof mass 23 carries a sensing tip 24 which comprises a surface angled with respect to the substrate in the same manner as sensing tip 4 in FIG. 1b. The accelerometer includes a component 26 which is mounted to the substrate 21 and which is relatively stiff compared to the cantilever 25 carrying the proof mass. The component 26 carries a counter electrode 28 which also has an angled surface in a similar manner as the counter electrode 8 of FIG. 1b. When the accelerometer of FIGS. 2a and 2b is subject to an accelerating force, the proof mass moves in a direction substantially perpendicular to the plane of the substrate (that is into and out of the plane of the paper in FIG. 2a). This movement causes the width of a sensing gap 30 defined between the sensing tip 24 and the counter electrode 28 to vary. This variation is sensed in a manner to be described more fully later.

Figure 3A:
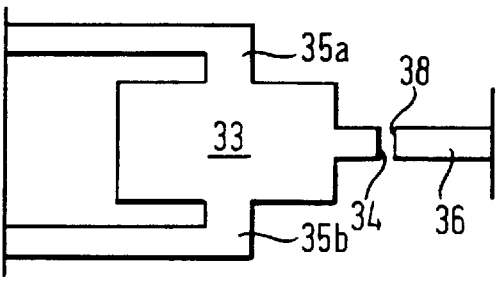
FIGS. 3a and 3b are a plan view and a side view of an alternative embodiment of a proof mass with sensing electrodes in an accelerometer.
Figure 3B:
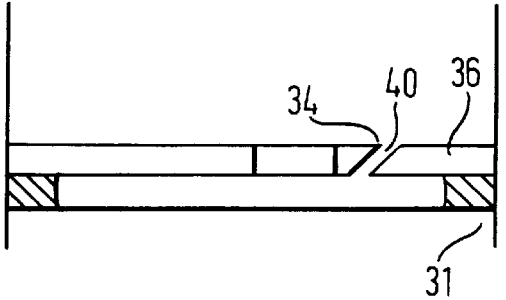

FIGS. 3a and 3b illustrate an alternative embodiment of an accelerometer in which the mounting of the proof mass provides greater stiffness parallel to the plane of the substrate than the embodiment shown in FIG. 2a. In FIG. 3a, reference numeral 33 denotes the proof mass which is mounted in a cantilevered fashion on two cantilevers 35a, 35b relative to the substrate 31 (FIG. 3b). The proof mass 33 carries a sensing tip 34. A component 36 mounted to the substrate and relatively stiff with respect to the proof mass mounting carries a counter electrode 38. As described hereinabove in relation to FIGS. 1a and 1b and FIGS. 2a and 2b, the sensing tip 34 and counter electrode 38 comprise surfaces angled with respect to the substrate and which define therebetween a sensing gap 40.

In the arrangement of FIGS. 2a and 2b and FIGS. 3a and 3b, the relatively stiff component 26,36 is arranged externally of the proof mass 23,33.

Figure 4:
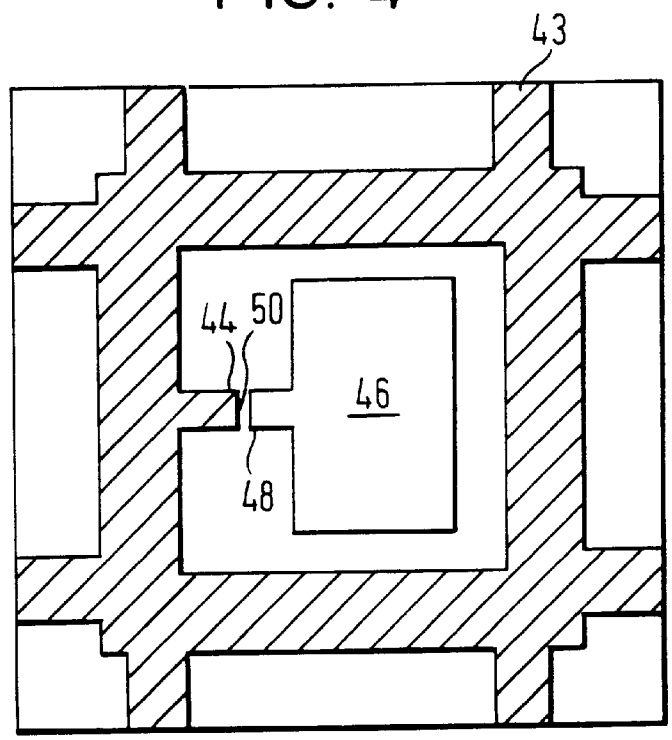
FIG. 4 is a plan view of an alternative arrangement of a proof mass in an accelerometer.

FIG. 4 illustrates in plan view an embodiment where the proof mass designated by reference numeral 43 is constructed symmetrically around a component designated by numeral 46, which is mounted to the substrate so as to be relatively stiff with respect to the mounting of the proof mass. In the same manner as has already been discussed, the relatively stiff component 46 carries a counter electrode 48 and the proof mass 43 carries a sensing tip 44. The sensing tip 44 and the counter electrode 48 define between them a sensing gap 50. The arrangement of FIG. 4 has a higher in-plane stiffness than that of FIGS. 2a and 2b and FIGS. 3a and 3b.

Figure 5:
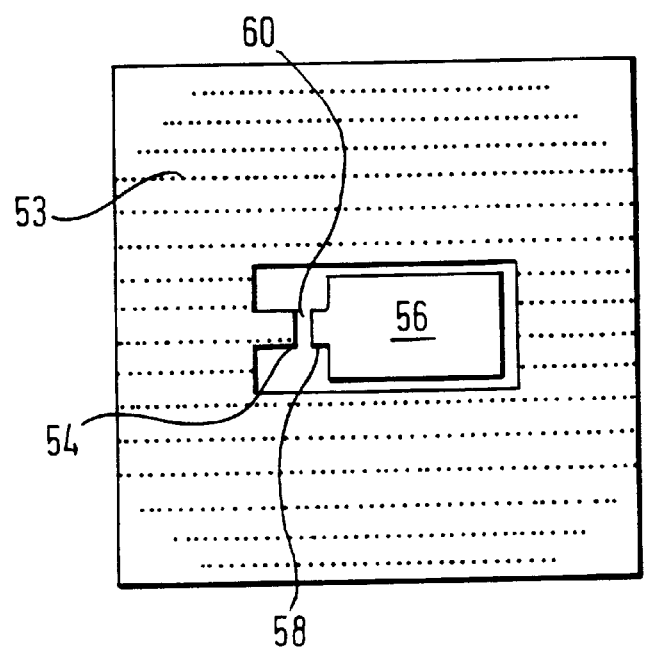
FIG. 5 is a further alternative arrangement of a proof mass in an accelerometer.

FIG. 5 illustrates in plan view an arrangement wherein the proof mass, denoted by reference numeral 53 is formed as a continuous diaphragm supported with respect to the substrate. A component 56 is again arranged in the middle of the diaphragm mounted to the substrate in a manner which is relatively stiff compared to the mounting of the proof mass and carries a counter electrode 58 which defines with a sensing tip 54 provided on the proof mass 53 a sensing gap 60. In the arrangement of FIGS. 4 and 5, the sensing tip 44 and 54 and counter electrode 48,58 have angled surfaces as already discussed above with reference to FIGS. 1a,1b,2a,2b and 3a,3b.

Figure 6A:
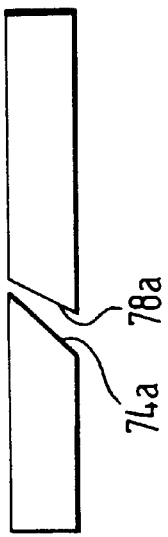
FIGS. 6a and 6b are a plan view and a side view of an alternative embodiment of sensing electrodes in an accelerometer.
Figure 6B:
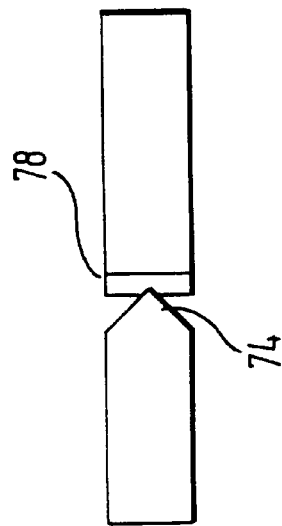

FIGS. 6a and 6b are a plan view and side view respectively of a different embodiment of sensing electrodes in which the sensing tip comprises a point 74 having an angled surface 74a when seen in side view and the counter electrode 78 has an angled plane surface 78a. The sharpness of the point may be adjusted and multiple points may be used.

The sensing tip 74 and counter electrode 78 of FIGS. 6a and 6b can be used in place of the plane angled surfaces of the preceding figures.

Figure 7:
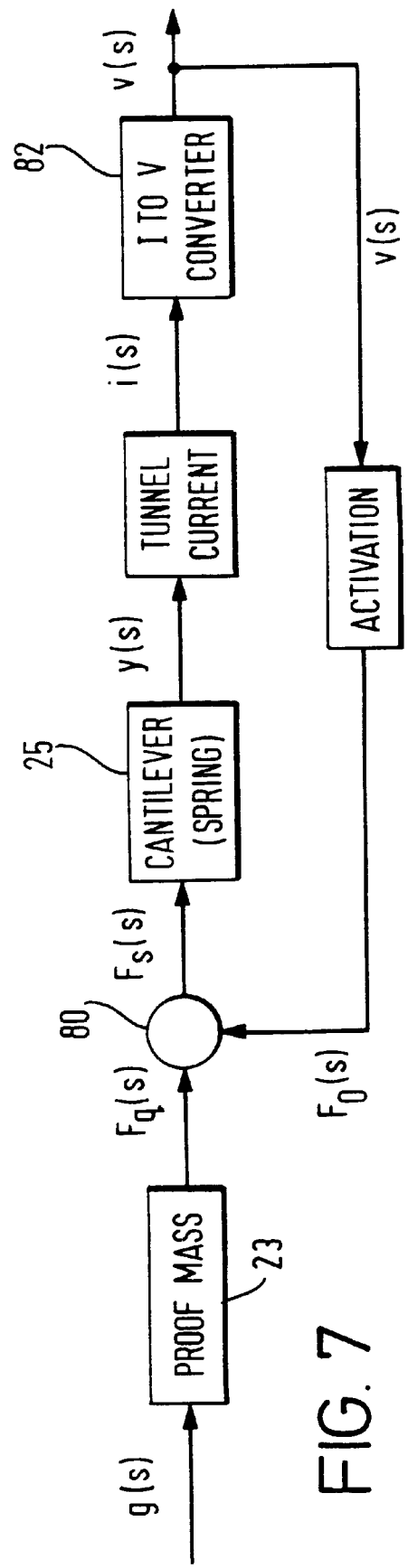
FIG. 7 is a circuit diagram of sense circuitry for an accelerometer.

FIG. 7 is a block diagram of a feedback loop constituting the circuitry used to sense changes in the width of the sensing gap of the preceding arrangements. A voltage is applied between the structure constituting the proof mass and cantilever and the substrate to bring the width of the sensing gap to a distance where a tunnelling current will pass between the sensing tip and counter electrode. For example, a voltage of about 8V can be applied to hold the sensing gap at a width of about 5 nm. When the accelerometer is subjected to an accelerating force, the proof mass moves in a direction perpendicular to the plane of the substrate thus changing the width of the sensing gap. This change in width changes the magnitude of the tunnelling current and hence alters the voltage applied between the substrate and the sensing tip. The change in voltage alters the electric field in a direction such as to restore the gap to its original width. The output of the sensor is the change in magnitude of the voltage as a result of changing the tunnelling current, which is proportional to the square root of the accelerating force.

In FIG. 7, g(s) represents the accelerating force function applied to the proof mass 23. The resulting force on the proof mass $F_q(s)$ is input to a feedback comparator 80 which also receives a feedback force $F_0(s)$. The resulting force $F_s(s)$ is converted to a displacement $y(s)$ dependent on the stiffness of the cantilever 25 used to support the proof mass 23. The displacement $y(s)$ causes a corresponding change in the tunnel current $i(s)$ which is fed to a current to voltage converter 82 the output of which $v(s)$ is the output of the accelerometer. The output $v(s)$ also acts through the activation arm of the feedback loop to generate the feedback force $F_0(s)$.

As described above, the difference in voltage applied between the structure constituting the cantilever and the proof mass and the substrate causes a local electric field which acts to hold the gap to about 5 nm in the absence of acceleration. This is so-called electrostatic pulling. Electrostatic pulling could be replaced by other forms of activation, such as piezoelectric. The output voltage would be fed back into a piezoelectric material and the force generated by that material would restore the gap width in place of forces from the electric field. Other activation methods may also be used.

Overload protection for the accelerometer is provided by physical end stops. The silicon substrate 21 itself prevents excessive downward motion. A further glass plate, for example denoted 27 in FIG. 2b essentially a second substrate, although not necessarily single crystal, can be provided to limit upward motion. Although a second substrate may be provided to limit upward motion, there is no need for any components to be formed within the second substrate and thus there is no need for careful alignment of the second substrate with the substrate carrying the accelerometer components.

Further protection against the possibility of an overload damaging the sensing electrodes can be provided by decreasing the spring constant of the extremity of the cantilever 25 in FIG. 2a closest to the sensing tip 24 in FIG. 2(a) such that it bends should the proof mass component 23 crash into the substrate. Similarly this may also be done for the extension of the proof mass 33 which carries the sensing tip 34 in FIG. 3(a).

Further protection against the possibility of an overload damaging the sensing electrodes can be provided by decreasing the spring constant of component 26 in FIG. 2(a) such that it bends should the proof mass component 23 crash into the substrate. Similarly this can also be done for component 36 in FIG. 3(a).

Figure 8A:
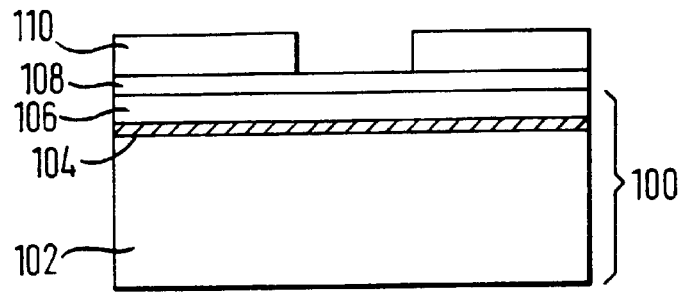
FIGS. 8a to 8e are sections through a wafer during various steps in the manufacture of an accelerometer.
Figure 8B:
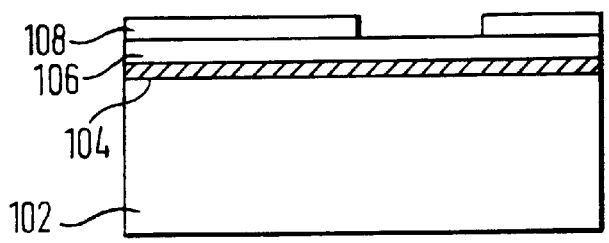
Figure 8C:
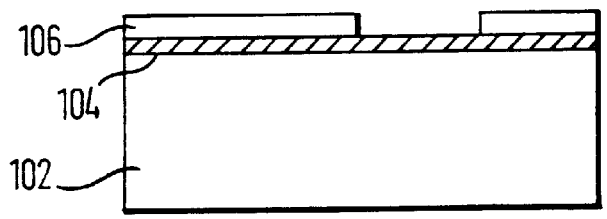
Figure 8D:
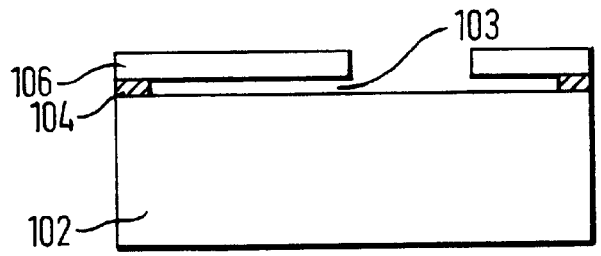
Figure 8E:
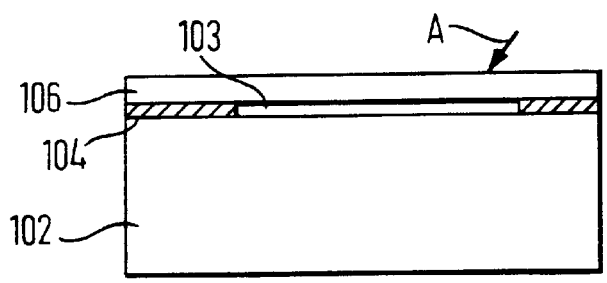

Reference will now be made to FIGS. 8a to 8e to describe a method of manufacture of an accelerometer in accordance with one embodiment of the invention. In FIG. 8a reference numeral 100 denotes a single composite wafer comprising a silicon substrate 102, a layer of silicon dioxide 104 on top of the substrate 102 and a top layer of silicon 106. The thickness of the substrate in the described example is 500 um <100>Si, the thickness of the oxide layer 104 is 2 um and the thickness of the top silicon layer 106 is 7 um. Composite wafers having this structure are commercially available. The top layer 106 could be single crystal silicon or polysilicon. Single crystal silicon can be produced by depositing silicon and recrystallising it after deposition or by bonding two oxidized wafers and thinning one side. A layer 108 of silicon nitride is placed on top of the top silicon layer 106. Photoresist 110 is used to define a pattern to be etched from the silicon, for example that shown in plan view in FIG. 2a. The silicon nitride layer 108 is etched using the photoresist 110 as a mask to give the structure shown in FIG. 8b. The silicon nitride layer is then used as an etch stop for a subsequent etch through the top silicon layer which will define the shape of the proof mass and supporting cantilevers and fixed contact components. In section, the structure is as shown in FIG. 8c. A wet etch using buffered hydrofloric acid is then used to remove the oxide layer from beneath the top silicon layer to provide silicon components, supported in a cantilevered fashion and spaced from the substrate by an undercut region 103. This is shown in section in FIG. 8d. FIG. 8a to 8d are sections taken along a line running up and down the paper in FIGS. 2a and 2b. FIG. 8e is a section taken transversely of these sections and which extends through the cantilevered and fixed components before a cut is made to define the tip and counter electrode. The location and angle of the cut is illustrated for example by arrow A. The cut is made using a focused high energy ion beam or a laser to define two angled parallel surfaces constituting the sensing electrodes of the accelerometer. The initial gap may have a width of about 200 nm and is closed as discussed above by application of an electric field to a width which will allow a tunnelling current to flow, for example about 5 nm.

We claim:

1. An accelerometer comprising:
   a substrate having a surface which defines a plane;
   a structure comprising a proof mass mounted to the substrate for movement in a first direction substantially perpendicular to the plane of the substrate, the proof mass carrying a first sensing electrode having a first surface extending at an oblique angle relative to the plane of the substrate;
   a second sensing electrode mounted to the substrate and having a second surface, the second surface extending at an oblique angle relative to the plane of the substrate and oriented in spaced relation to the first surface of the first sensing electrode to define a sensing gap, having a width, between the first surface and the second surface; and
   circuitry for applying an activation force between the substrate and said structure constituting the proof mass and the first electrode wherein the width of the sensing gap varies with movement of the proof mass in the first direction.

2. An accelerometer according to claim 1 wherein the proof mass and the first and second sensing electrodes are formed as components in a single wafer.

3. An accelerometer according to claim 2 which is formed in single crystal silicon.

4. An accelerometer according to claim 1 which comprises circuitry for sensing variations in the width of the sensing gap.

5. An accelerometer according to claim 4 wherein the sensing circuity detects changes in a tunnelling current between the first and second sensing electrodes.

6. An accelerometer according to claim 1 wherein the substrate includes a center region and an outer region surrounding the center region, the second sensing electrode is mounted to the substrate in the center region, and the proof mass is mounted to the outer region of the substrate and surrounds the second sensing electrode.

7. An accelerometer according to claim 6 wherein the proof mass comprises a perforated diaphragm suspended for movement in the first direction relative to the substrate.

8. An accelerometer according to claim 1 which comprises a limit plate arranged to limit movement of the proof mass away from the substrate.

9. A method of making an accelerometer in a substrate having a surface which defines a plane, the method comprising the steps of:
   forming a component having a central region and opposing end regions, wherein the component is supported by and coupled to the substrate at the opposing end regions and spaced from the substrate at the central region; and cutting a sensing gap in the component at an oblique angle incident to the plane of the substrate to form a first angled surface corresponding to a first sensing electrode and a second angled surface corresponding to a second sensing electrode, the first and second angled surfaces having the sensing gap between them, the first and second angled surfaces respectively extending at the oblique angle relative to the plane of the substrate, whereby the sensing gap has a width which may be held to a predetermined width using an activation applied between the substrate and the first sensing electrode and the width may vary with movement of the accelerometer.

10. A method according to claim 9 wherein the accelerometer is formed in a single composite wafer comprising a silicon substrate, a layer of silicon dioxide and a top layer of silicon.

11. A method according to claim 9 wherein the cutting step comprises cutting using a focused high energy ion beam.

12. A method according to claim 9 wherein the cutting step comprises cutting using a laser.

13. An accelerometer comprising:

a substrate having a surface which defines a plane;

a structure mounted to said substrate at a first location and having a proof mass extending in a second plane parallel to the plane of the substrate, said proof mass including a first sensing electrode having a first surface extending at an oblique angle relative to the plane of the substrate, wherein the structure is mounted to said substrate for movement of said proof mass in a first direction substantially perpendicular to the plane of the substrate;

a second sensing electrode extending in said second plane and mounted to the substrate at a second location, said second sensing electrode having a second surface, the second surface extending at an oblique angle relative to the plane of the substrate and oriented in spaced relation to the first surface of the first sensing electrode to define a sensing gap, having a width, between the first surface and the second surface;

wherein the width of the sensing gap varies with movement of the proof mass in the first direction whereby variations in the width of the sensing gap can be sensed to determine acceleration.

* * * * *

UNITED STATES PATENT AND TRADEMARK OFFICE
CERTIFICATE OF CORRECTION

PATENT NO. : 5,939,632
DATED : August 17, 1999
INVENTOR(S) : Moore et al.

It is certified that error appears in the above-indentified patent and that said Letters Patent is hereby corrected as shown below:

On the cover page, item [56] References Cited, OTHER PUBLICATIONS, of the Letters Patent, "K. Minami et al." should read --IEEE Cat. No. 93CH3265-6 --

Signed and Sealed this

Eighteenth Day of April, 2000

Attest:

Q. TODD DICKINSON

*Attesting Officer*           *Director of Patents and Trademarks*